United States Patent [19]

Hope et al.

[11] Patent Number: 5,350,647
[45] Date of Patent: Sep. 27, 1994

[54] ELECTRODES FOR ELECTROCHEMICAL DEVICES

[76] Inventors: Stephen F. Hope; Joseph B. Kejha, both of c/o Hope Industries, Inc., Willow Grove, Pa. 19090

[21] Appl. No.: 983,368

[22] Filed: Nov. 30, 1992

Related U.S. Application Data

[63] Continuation-in-part of Ser. No. 632,971, Dec. 24, 1990, abandoned.

[51] Int. Cl.$^5$ .............................................. H01M 4/40
[52] U.S. Cl. ...................................... 429/218; 420/400
[58] Field of Search ....................... 429/218, 194, 209; 420/400, 415, 402

[56] References Cited

U.S. PATENT DOCUMENTS

| | | | |
|---|---|---|---|
| 2,849,309 | 8/1958 | Whaley | 420/402 |
| 2,916,359 | 11/1960 | Lillie et al. | 420/402 X |
| 3,563,730 | 2/1971 | Bach et al. | 420/415 X |
| 4,818,645 | 4/1989 | Harris et al. | 429/209 |
| 4,960,655 | 10/1990 | Hope et al. | 429/192 |
| 5,102,475 | 4/1992 | Raynaud et al. | 420/400 X |
| 5,147,739 | 9/1992 | Beard | 429/218 X |
| 5,185,224 | 2/1993 | Barnabei et al. | 429/218 |

*Primary Examiner*—Anthony Skapars
*Attorney, Agent, or Firm*—Z. T. Wobensmith, III

[57] ABSTRACT

An improved alloy or composite electrode of lithium, magnesium and other materials in which magnesium is in the range of 5 to 50% of the total weight of the composite. The lithium and magnesium metal can be heated until they melt, and combine, and are cast into an ingot which is then formed into the desired shape as an electrode and placed into an electrochemical device or formed as an anode and placed into a battery. Other methods of combination can be used as desired to obtain the electrode.

12 Claims, No Drawings

ELECTRODES FOR ELECTROCHEMICAL DEVICES

CROSS REFERENCE TO A RELATED APPLICATION

This application is a continuation in part of a prior co-pending application of Stephen F. Hope and Joseph B. Kejha; Ser. No. 07/632,971, filed Dec. 24, 1990 now abandoned entitled "Composite Anode For Lithium Batteries."

BACKGROUND OF THE INVENTION

1. Field of the Invention

This invention relates to electrodes for electrochemical devices such as capacitors and to anodes for lithium batteries, and the like, which electrode is an alloy or composite of lithium with at least one other material.

2. Description of the Prior Art

While lithium electrodes are satisfactory for incorporation into electrochemical devices, and as anodes for incorporation into batteries, pure lithium is difficult to work with as it has a low melting point, is subject to corrosion and limits the number of charging cycles that the device can sustain.

It has been proposed to form alloys of lithium with other materials such as aluminum, tin, silicone, and cadmium for use as electrodes but the resultant products have not provided the desired improvements. It has now been found that forming alloys or composites of lithium with magnesium alone, or with magnesium and other selected materials, produces products that when fabricated into electrodes, increase the cycling capability of the devices three to four times that where the electrode is of pure lithium, and which provides other advantages.

SUMMARY OF THE INVENTION

This invention relates to improved electrodes which are composites or alloys of lithium combined with a selected material or materials which increase the cycling capability of the electrochemical device into which the electrode is incorporated.

The principal object of the invention is to provide electrodes of lithium combined with magnesium, or with magnesium and at least one other material, but where magnesium is the predominant material by weight after lithium. The electrodes, when incorporated into electrochemical devices and as anodes into batteries provide increased cycling capability and rechargeability.

A further object of the invention is to provide an electrode of the character aforesaid is which of lighter weight than previous electrodes.

A further object of the invention is to provide an electrode of the character aforesaid which is simple to construct, and of long life.

A further object of the invention is to provide an electrode of the character aforesaid which can be formed into a variety of shapes.

Other objects and advantageous features of the invention will be apparent from the description and claims.

DESCRIPTION OF THE PREFERRED EMBODIMENTS

The electrode of the invention is an alloy or composite of lithium and a selected compatible material or materials. In one embodiment the pure lithium and the material, or materials may be melted until they combine, and are then formed into ingots. The ingots are fabricated into electrodes which can then be incorporated into electrochemical devices such as capacitors and as anodes for incorporation into batteries. It has been found that lithium alloyed with magnesium alone will provide an electrode which will markedly increase the cycling capability and rechargeability of electrochemical devices. Specifically magnesium combined with lithium has been found to provide an anode which increases the cycling capacity of a battery by three to four times that of a battery with a pure lithium anode alone, and provides a very light weight alloy, since magnesium is the third lightest metal after lithium.

An alloy or composition of lithium with magnesium together with another material or materials, such as aluminum, tin, cadmium, silicon, carbon and other compatible materials from trace amounts to 30% of total weight, but predominantly with magnesium by weight is also useful.

Example I. 75 grams of lithium metal were heated to 700° C. and melted while in an inert atmosphere of argon gas. Magnesium in an amount of 25 grams was added to the molten lithium, which melted together and was thoroughly mixed, the resultant mixture was cast into a graphite mold and cooled to 20° C. to form an ingot. The ingot was skinned to remove any impurities that had come to the surface. The ingot while in an inert atmosphere was rolled to form a foil of 4 to 6 mils thickness, and incorporated into a lithium battery as described in U.S. Pat. No. 4,960,655, and Patent Application Ser. Nos. 07/313,993, filed Feb. 23, 1989, now U.S. Pat. Nos. 5,006,431 and 07/572,253.

Example II. 73 grams of lithium metal were heated to 700° C. and melted while in an inert atmosphere of argon gas. Magnesium in an amount of 22 grams was added which melted together and was thoroughly mixed. 5 grams of aluminum was added to the mixture and melted together.

The resultant mixture was then cast into a mold and cooled to 20° C. to form an ingot. The ingot while in an inert atmosphere was extruded into a foil of 4 to 6 mil thickness and the foil incorporated into a battery similar to those described in Example I above.

Tests on the cycling capability of the battery constructed as described in Examples I and II with a control battery having an anode of pure lithium showed a cycling increase of a minimum of three times that obtained from the pure lithium anode battery.

While the lithium alloy anode has been described as being formed by melting lithium and magnesium or lithium, magnesium and other materials to form the ingot, other methods of fabrication can be used, where the combination is of lithium and magnesium fibers, or of magnesium suspended in a lithium matrix which when incorporated into an anode in a battery provide equal or similar results.

Further tests have been conducted and alloys formed which established that a lithium magnesium alloy with 5 to 50% of magnesium by weight or a lithium, magnesium and other materials alloy, with 5% to 50% of magnesium and another material from trace amounts up to 30% by weight, and formed into electrodes provides improved cycling capabilities of the electrochemical devices into which they are incorporated.

It is accordingly believed that the objects of the invention have been achieved.

We claim:

1. An electrode for use in electrochemical devices which comprises
   a lithium-based alloy consisting of lithium, magnesium and other compatible materials, where the magnesium is in the amount of 5% to b 50% of the total weight of the alloy, and the other materials are selected from the group consisting of silicon, aluminum, tin, cadmium, and carbon, in trace amounts to 30% of the total weight of the alloy, with magnesium present as the predominant metal by weight after lithium.

2. An electrode for use in electrochemical devices which comprises
   a lithium-based composite consisting of lithium, magnesium, and other materials, where the magnesium is in the amount of 5% to 50% of the total weight of the composite, and the other materials are selected from the group consisting of silicon, aluminum, tin, cadmium and carbon, in trace amounts to 30% of the total weight of the composite with magnesium the predominant metal by weight after lithium.

3. An electrode as described in claim 2 in which said magnesium component is of magnesium fibers.

4. An electrode as described in claim 2 in which said magnesium component is of magnesium expanded foil. consisting of silicon, aluminum, tin, cadmium and carbon.

5. An electrode as described in claim 2 in which said composite consists of magnesium and other materials suspended in a lithium matrix.

6. An electrode as described in claim 5 in which said magnesium component is of magnesium fibers.

7. An electrode as described in claim 5 in which said magnesium component is of expanded magnesium foil.

8. An electrode as described in claim 1 in which said electrochemical device is a lithium battery cell, and said electrode is an anode.

9. An electrode as described in claim 2 in which said electrochemical device is a lithium battery cell, and said electrode is an anode.

10. An electrode as described in claim 1 which increases the cyclability of the electrochemical devices.

11. An electrode as described in claim 2 which increases the cyclability of the electrochemical devices.

12. A composite as described in claim 2 in which said magnesium is suspended in a lithium matrix.

* * * * *

UNITED STATES PATENT AND TRADEMARK OFFICE
CERTIFICATE OF CORRECTION

PATENT NO. : 5,350,647
DATED : September 27, 1994
INVENTOR(S) : STEPHEN F. HOPE AND JOSEPH B. KEJHA It is certified that error appears in the above-identified patent and that said Letters Patent is hereby corrected as shown below:

COLUMN 1

Line 53, Delete "is which" and insert -- which is --

COLUMN 3

Line 6, in claim 1, after "to" delete "b"

COLUMN 4

Lines 5-6, after claim 4, delete "consisting of silicon, aluminum, tin, cadmium and carbon."

Signed and Sealed this

Fifteenth Day of November, 1994

Attest:

BRUCE LEHMAN

*Attesting Officer*      *Commissioner of Patents and Trademarks*